June 21, 1955  M. A. EDSON  2,711,048
FISHING LURE
Filed June 25, 1951
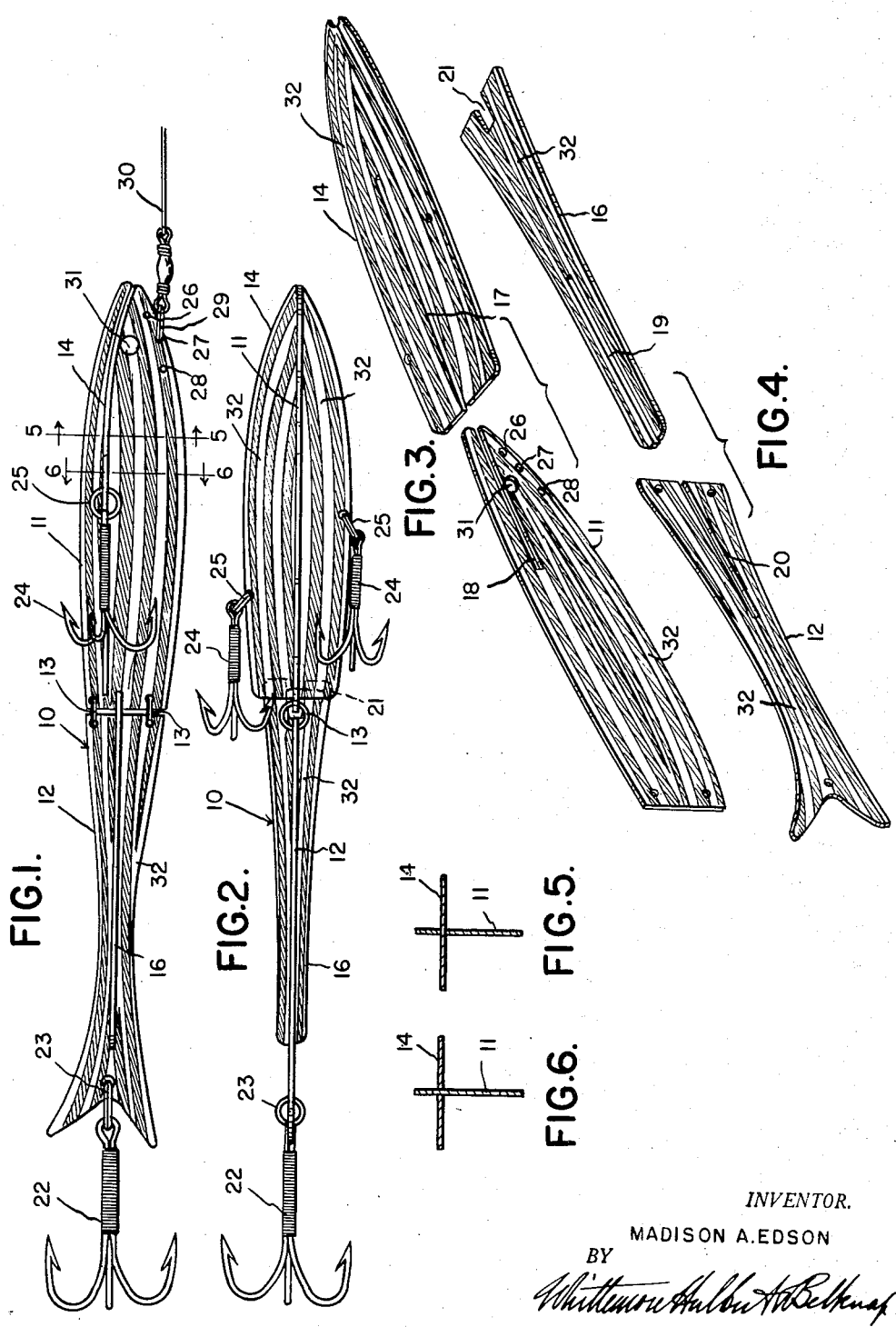
INVENTOR.
MADISON A. EDSON
BY
ATTORNEYS

United States Patent Office 2,711,048
Patented June 21, 1955

2,711,048

FISHING LURE

Madison A. Edson, Grayling, Mich.

Application June 25, 1951, Serial No. 233,362

1 Claim. (Cl. 43—42.18)

This invention relates to fishing lures of the type suitable for trolling and/or casting.

One of the objects of this invention is to provide an articulated lure which affords a wide variety of actions depending on the conditions under which it is used, and is highly suitable for surface or underwater use.

It is another object of this invention to provide an articulated fishing lure which is practically indestructible, and which is composed of relatively few parts capable of being formed of sheet metal by relatively simple stamping operations.

It is still another object of this invention to provide a fishing lure simulating a fish in general outline and having substantially flat tail and head sections hingedly coupled together in a manner to permit limited relative movement of the sections in practically all directions.

It is a further object of this invention to provide a fishing lure of the type set forth above having fins projecting laterally outwardly from opposite sides of the tail and head sections. These fins act somewhat similarly to sponsons or bearing areas and cooperate with the flat tail and head sections to impart the desired action to the lure during use.

It is still another object of this invention to provide the lure with bright contoured lines which impart attractiveness to the lure and make it readily visible when in use. The head, tail and fins of the lure may be formed of bright sheet metal such as aluminum and the bright contour lines may be produced on one or more of the above parts by an engraving operation. As a result of the engraving operation, shallow grooves or scratches are formed in the parts, and these grooves or scratches reflect the light to such an extent that the lure gives a bright flashing apperance when in use.

The foregoing as well as other objects will be made more apparent as this description proceeds, especially when considered in connection with the accompanying drawing, wherein:

Figure 1 is a side elevational view of an artificial lure embodying the features of this invention;

Figure 2 is a top plan view of the construction shown in Figure 1;

Figure 3 is an exploded perspective view of the head section of the lure and the associated fin;

Figure 4 is an exploded perspective view of the tail section of the lure and the associated fin;

Figures 5 and 6 are respectively cross sectional views of the head section only of the body taken on the lines 5—5 and 6—6 of Figure 1.

The artificial lure forming the subject matter of this invention has a body 10 simulating a fish in general outline, as clearly shown in Figure 1 of the drawings. The body 10 comprises a head section 11 and a tail section 12 having the adjacent ends hingedly connected together by rings 13. The rings 13 are of a nature to provide a loose permanent pivotal connection between the head section 11 and tail section 12, so that these sections have limited relative movement in practically all directions.

A fin 14 is carried by the head section 11 and has substantially flat portions projecting laterally outwardly from opposite sides of the head section. As shown in Figure 1 of the drawings, the fin 14 is located in relatively close proximity to the top edge of the head section 11 and curves downwardly at the front end to conform generally to the contour of the adjacent top edge portion of the head section 11.

A fin 16 is also carried by the tail section 12 and portions of the fin project laterally outwardly from opposite sides of the tail section, as shown in Figure 2 of the drawings. The fin 16 is located at a somewhat lower elevation than the fin 14.

The head section 11, tail section 12, fins 14 and 16 are shown herein as formed of substantially flat sheets of bright metal, such for example, as aluminum. The design of the above parts is such as to permit the same to be readily produced on a production basis by simple stamping operations. It is to be understood, however, that the above noted parts of the artificial lure may be produced from other materials such for example as sheet or molded plastics. In any case the body 10 may be formed of one piece, if desired, and later cut intermediate the ends to provide the head and tail sections 11 and 12 respectively. However it will also be understood that the head and tail sections may be separately formed if such practice is found more suitable.

Also in practice the fin 14 may be formed of a single sheet of material and slotted as indicated by the reference numeral 17 in Figure 3. The slot 17 extends lengthwise of the fin 14 from the rear edge of the latter, and terminates at a point intermediate the ends thereof. The head section 11 is formed with a slot 18 which extends lengthwise of the head section from the front end of the latter. The arrangement is such that when the fin section 14 is assembled on the head section 11, the portion of the head section rearwardly of the slot 18 is received in the slot 17, and the portion of the fin in advance of the front end of the slot 17 is received in the slot 18. Thus the fin 14 is interlocked with the head section 11 in a position such that the portions of the fin at opposite sides of the slot 17 project laterally from opposite sides of the head section 11.

Referring now to Figure 4 of the drawing, it will be noted that the fin 16 has a slot 19 which extends forwardly from the rear end of the fin and terminates intermediate the ends of the fin. The tail section 12 also has a slot 20 which extends from the front end of the tail section rearwardly to a point intermediate the ends of the latter section. Thus the tail section 12 and fin 16 may be assembled in interlocking engagement in the same manner previously described in connection with the head section 11 and the fin 14. The front end of the fin 16 extends beyond the corresponding end of the tail section 12 and has a clearance slot 21 for receiving the rear end of the head section 11.

In use the fins 14 and 16 act somewhat similarly to a sponson, in that they assist in maintaining the lure afloat at different depths depending upon the rate at which the water passes beneath the fins. Also due to the articulated nature of the body 10, there is a tendency for the tail section 12 to shift or "flip" sideways. In addition the articulated nature of the body 10, together with the action of the fins 14 and 16, renders it possible to manipulate the lure in a manner such that it jumps and spurts, simulating a feeding fish.

In the embodiment of the invention shown, a gang of hooks 22 is suitably connected to the rear end of the tail section 12 by a ring 23, and gangs of hooks 24 are respectively connected to opposite sides of the fin 14 by rings 25. As shown particularly in Figure 1 of the drawings, the head section 11 is formed with a plurality of openings 26, 27 and 28. These openings are spaced from each other along the bottom edge of the head section 11 adjacent the front end of the latter, and are adapted for selective engagement by a ring 29 to a suitable leader 30. The spacing of the openings 26, 27 and 28 is such as to provide different actions of the lure in use. For example when the ring 29 of the leader is engaged in the first opening 26, the lure has a tendency to assume an inverted position in the water; and in any case, provides considerable action somewhat below the surface of the water. When the leader is engaged with the second opening 27, the lure assumes a position much closer to the surface of the water, and when engaged with the opening 28, it has a tendency to work with the front end of the head section extending out of the water. Also this latter position of the leader influences the action of the lure to jump and skip out of the water, simulating a feeding fish. If desired an opening 31 may be provided in the head section 11 adjacent the front end thereof for receiving a weight. This arrangement is preferred in cases where it is desired to manipulate the lure at a depth substantially below the surface of the water.

It will be noted from Figures 1 to 4 inclusive that the head section 11, tail section 12, fin 14 and the fin 16 have the surfaces thereof scratched or engraved to provide shallow grooves 32. These grooves tend to facilitate reflection of light from the surfaces of the above parts of the lure, and give the latter an exceptionally bright appearance in the water. This feature, together with the action of the lure, greatly increases the attraction of the lure to fish.

What I claim as my invention is:

A fishing lure comprising a flat plate-like body having head and tail sections, means hingedly connecting the rear end of said head section to the front end of said tail section to permit relative movement of said sections in a plane generally perpendicular to the opposite flat sides of said sections, said head section having means at the front end attachable to a leader, means on said body for supporting hooks, and first and second flat plate-like fins carried by and extending at right angles to said head and tail sections respectively, said fins having portions projecting laterally outwardly from the opposite flat sides of the respective sections to provide water bearing surfaces, said head and tail sections each having a slot intermediate opposite side edges extending rearwardly from the front end thereof, said first and second fins being respectively received in the slots of said head and tail sections, said fins each having a slot intermediate opposite side edges extending forwardly from the rear end thereof, said head and tail sections being respectively received in the slots of said first and second fins, said second fin carried by said tail section having a clearance slot in the front end thereof wider than the thickness of said head section, and the portions of said second fin on opposite sides of said slot loosely embracing the opposite flat sides of the adjacent rear end of said head section, thereby to limit the aforesaid relative movement of said sections.

References Cited in the file of this patent

UNITED STATES PATENTS

| | | |
|---|---|---|
| D. 154,098 | Carr | June 14, 1949 |
| 962,237 | Murry | June 21, 1910 |
| 1,300,488 | Robinson | Apr. 15, 1919 |
| 1,332,112 | Duhamel | Feb. 24, 1920 |
| 1,402,798 | Ryan | Jan. 10, 1922 |
| 1,519,174 | Tomlin | Dec. 16, 1924 |
| 2,223,591 | Andersson | Dec. 3, 1940 |
| 2,503,607 | Arf | Apr. 11, 1950 |
| 2,561,515 | Keeler | July 24, 1951 |
| 2,590,461 | Rasch | Mar. 25, 1952 |

FOREIGN PATENTS

| | | |
|---|---|---|
| 59,398 | Austria | May 26, 1913 |